United States Patent
Lasser

(10) Patent No.: US 10,391,465 B2
(45) Date of Patent: Aug. 27, 2019

(54) TRAY DECK ORIFICE DEVICE AND METHODS OF REPAIRING A TRAY DECK

(71) Applicant: Woven Metal Products, Inc., Alvin, TX (US)

(72) Inventor: Robert Lee Lasser, Alvin, TX (US)

(73) Assignee: Woven Metal Products, Inc., Alvin, TX (US)

( * ) Notice: Subject to any disclaimer, the term of this patent is extended or adjusted under 35 U.S.C. 154(b) by 0 days.

(21) Appl. No.: 16/149,232

(22) Filed: Oct. 2, 2018

(65) Prior Publication Data
US 2019/0030504 A1 Jan. 31, 2019

Related U.S. Application Data

(60) Continuation of application No. 15/966,866, filed on Apr. 30, 2018, now Pat. No. 10,112,164, which is a division of application No. 15/009,416, filed on Jan. 28, 2016, now Pat. No. 9,981,235.

(51) Int. Cl.
| | |
|---|---|
| *B01J 4/00* | (2006.01) |
| *B01D 3/16* | (2006.01) |
| *B01J 3/03* | (2006.01) |

(52) U.S. Cl.
CPC .............. *B01J 4/008* (2013.01); *B01D 3/163* (2013.01); *B01J 3/03* (2013.01)

(58) Field of Classification Search
CPC .............. B01D 3/163; B01J 3/03; B01J 4/008
USPC .......... 261/114.1, 114.2, 114.3, 114.4, 114.5
See application file for complete search history.

(56) References Cited

U.S. PATENT DOCUMENTS

| | | | |
|---|---|---|---|
| 1,898,801 | A | 2/1933 | Wilkinson |
| 2,819,049 | A | 1/1958 | Manning et al. |
| 2,982,527 | A | 5/1961 | Eld et al. |
| 3,013,782 | A | 12/1961 | Glitsch |
| 3,037,754 | A | 6/1962 | Glitsch |
| 3,385,577 | A | 5/1968 | Epstein |
| 4,028,443 | A | 6/1977 | Livingston et al. |
| 4,290,981 | A | 9/1981 | Schramm |
| 4,382,901 | A | 5/1983 | Thomas |
| 6,053,485 | A | 4/2000 | Pan et al. |
| 6,270,062 | B1 | 8/2001 | Chuang et al. |
| 8,074,972 | B2 | 12/2011 | Agnello |
| 9,981,235 | B2 | 5/2018 | Lasser |
| 10,112,164 | B2 * | 10/2018 | Lasser ..................... B01J 4/008 |
| 2007/0227595 | A1 | 10/2007 | Zhang et al. |

FOREIGN PATENT DOCUMENTS

| | | |
|---|---|---|
| AU | 3037867 A | 6/1970 |
| GB | 1186883 A | 4/1970 |

OTHER PUBLICATIONS

Notification of Transmittal of the International Search Report and Written Option filed in counterpart application PCT/US2017/015354, dated May 23, 2017.
Extended European Search Report dated May 29, 2019 received in counterpart European Application No. 17744978.2.

* cited by examiner

*Primary Examiner* — Charles S Bushey
(74) *Attorney, Agent, or Firm* — Blank Rome LLP

(57) ABSTRACT

A tray deck for use in a vessel and a method of repairing a damaged tray deck. The method includes coupling a tray deck orifice repair device to the damaged tray deck. The tray deck orifice repair device is coupled with a valve.

11 Claims, 2 Drawing Sheets

TRAY DECK ORIFICE DEVICE AND METHODS OF REPAIRING A TRAY DECK

RELATED APPLICATIONS

This application is a continuation of U.S. application Ser. No. 15/966,866, filed Apr. 30, 2018, now U.S. Pat. No. 10,112,164, which is a divisional of U.S. application Ser. No. 15/009,416, filed Jan. 28, 2016, now U.S. Pat. No. 9,981,235, the subject matter of which is herein incorporated by reference.

FIELD OF THE INVENTION

The invention relates to a new and useful orifice device for repair and improvement of fluid contact trays used inside towers, reactors and other vessels in petroleum and chemical processes.

BACKGROUND OF THE INVENTION

Fluid contacting trays are the flow control means inside towers, reactors and other vessels that are commonly utilized for both petroleum and chemical processes, such as fractionation, absorption, distillation, separation, recovery, refinement, or purification. Gases, vapors, or liquids are thoroughly mixed in a controlled manner for mass transfer, heat transfer, and/or chemical reactions as required for the specific process service. Tray decks are flat, elongated panels that utilize special orifices and valves to regulate flow that takes place inside towers and other vessels. Typically, gases, vapors, or liquids are contacted in a controlled manner by utilizing tray decks on which a predetermined amount of flow is maintained. These tray decks have a plurality of orifice holes or openings along their surface, which extend through the tray deck from one surface to the opposing surface. Gases, vapors, or liquids that are present below the tray deck flow through these orifices, thus contacting the liquid which is maintained on the upper surface of the tray deck, where the mass transfer, heat transfer, and/or chemical reactions all occur.

The orifices in the tray deck are closed with moving valves that control the flow of gases, vapors, and/or liquids from beneath the tray deck to the upper surface of the tray deck, and prevent backflow of liquid from above to below the tray deck. These valves help to regulate the amount of gas, vapor, or liquid that flows through the orifices, thus controlling the reaction (similar to a pop it valve). Their operation is a function of the flow rate of the gases or vapors that are introduced into the environment below the tray deck. This flow rate affects the gas, vapor, or liquid pressure beneath the tray deck, thus affecting the pressure experienced by each valve independently moving within its orifice. In operation, these flow rates can be relatively high, causing the valves not only to lift upward while positioned in the tray deck orifices, but also to move laterally and/or to rotate within the orifices. The metal legs that hold the valve in place and prevent the valve from being pushed upward through the orifices often cut and enlarge the orifices with their repeated rotation. Such rotation is detrimental, because over time, the rotating valve will wear down the inner surface of each of the orifices, thus causing them to grow larger and larger, until finally allowing the valve to be pushed through leaving an uncontrolled opening in the tray deck. In some situations, the orifices are enlarged by up to 20-30% larger than their original size. With respect to circular tray deck orifices, for example, they can become worn down such that their inner diameters grow larger. When this occurs, the mixing contact efficiency and pressure drop control both needed for the reaction are compromised because the liquid on the upper surface of the tray deck can flow freely down between the inner surface of the orifice and the valve. At the same time, the gases, vapors, and liquids below the tray deck can flow freely upward in the same manner. Without close regulation of the amount gas, vapor, and liquid that come into intimate contact with each other, the efficiency and control of the process is reduced.

The conventional method of solving this problem is to simply replace the tray deck periodically after it has experienced a detrimental amount of wear and tear. Replacement moving valves will no longer reliably stay in these worn down oversized tray deck orifices, so complete tray deck panel replacement is currently the only viable solution. However, after a few more years of the same service conditions, the exact same problem is very likely to re-occur. This not only requires costly and specialized custom made equipment panels, but it also requires regular entry maintenance of the enclosed vessel, which requires plant unit outage time, lost unit production, and ultimately increased unit operating costs.

Accordingly, the new orifice device herein eliminates the wear issue, and can repair existing tray deck enlarged orifices to prevent complete tray deck panel replacement.

SUMMARY OF THE INVENTION

To solve this problem, the invention is directed to a tray deck orifice device, which can be manufactured in, or installed on tray decks. The orifice device eliminates the wear damage in new tray decks. It prevents further damage and repairs existing damage on used tray decks. Use of the tray deck orifice device extends tray service life while reducing vessel maintenance and overall operation costs.

The tray deck orifice device used for repairs includes a flat member having a defined thickness and a void at a center thereof and at least one anti-spin tab extending from an edge of the flat member inwardly to the void. The repair device is designed to attach to the surface of the tray deck such that the void is aligned with a hole in the tray deck. At least one tray deck orifice repair device includes a flat member having a defined thickness, a circular void at the center thereof, and at least one anti-spin tab extending from an edge of the flat member inwardly; the flat member having a second diameter. The first diameter is longer than the second diameter.

The invention also provides a new tray deck orifice for use vessels which includes a substantially flat tray having an upper surface and a bottom surface and a plurality of circular openings extending through a thickness thereof, each of the plurality of circular openings having a first diameter, and at least one substantially circular tray deck orifice device is integral to the upper surface of the tray deck openings. At least one tray deck orifice device includes a circular void at a center thereof, and at least one anti-spin tab extending from an edge of the flat tray deck inwardly.

The invention is further directed to a method of repairing a tray deck using the tray deck orifice device of the invention. The method includes the steps of providing at least one tray deck orifice device each comprising a flat member having a defined thickness and a void at a center thereof, and coupling the at least one tray deck orifice repair device to an upper surface of the damaged tray deck such that void of each of the at least one tray deck orifice repair device is aligned with each of the plurality of openings on the tray deck. At least one tray deck orifice repair device has at least one anti-spin tab extending from an edge thereof and is coupled with a valve.

The invention may yet also provide a method of repairing a damaged tray deck for use in a vessel, comprising the steps of providing a tray deck orifice repair device comprising a member having a defined thickness and a void; coupling the tray deck orifice repair device to a surface of the damaged tray deck such that the void of the tray deck repair device aligns with an orifice on the tray deck; and positioning a valve in the void of the tray deck orifice repair device.

In some embodiments of the method, the tray deck orifice repair device has at least one inwardly extending anti-spin tab configured to prevent rotation of the valve; the tray deck orifice repair device is coupled to the surface of the tray deck by welding, friction, or any other means; and/or further comprises the step of bending at least one inwardly extending prong of the tray deck orifice repair device through the orifice of the damaged tray deck.

The invention may further provide a method of repairing a damaged tray deck for use in a vessel, comprising the steps of providing a tray deck orifice repair device comprising a substantially flat member having a defined thickness and a void at the center thereof; coupling the tray deck orifice repair device to a substantially flat upper surface of the damaged tray deck such that the void of the tray deck repair device aligns with an orifice on the tray deck; and positioning a valve in the void of the tray deck orifice repair device and the orifice of the tray deck.

In certain embodiments of the method, the tray deck orifice repair device has at least one inwardly extending anti-spin tab configured to prevent rotation of the valve; and/or the tray deck orifice repair device has at least one inwardly extending prong configured to extend through the orifice of the damaged tray deck.

The invention may yet further provide a tray deck for use in a vessel that comprises a substantially flat tray having a plurality of orifices extending through a thickness thereof; and a substantially circular tray deck repair device coupled to a surface of the tray. The tray deck repair device may have a substantially circular void at a center thereof, wherein the void is aligned with one of the plurality of orifices. The void of the tray deck repair device is configured to receive a valve.

In one embodiment, at least one valve is positioned within the void of the tray deck orifice device. In another embodiment, the tray deck repair device has at least one anti-spin tab extending from an inner edge of the void; the tray deck repair device has at least one inwardly extending bendable prong.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The tray deck orifice device (hereinafter, the "repair device") is installed on each orifice of a tray deck used in a vessel. The repair device engages each of the worn down orifices on the tray deck, thereby restoring their original size. In this way, the flow control valve may then be re-positioned in the repaired orifice such that it snugly fits therein, thus restoring the efficiency of the mass transfer, heat transfer, and/or reaction occurring on the surface of the tray deck.

Figure 1:
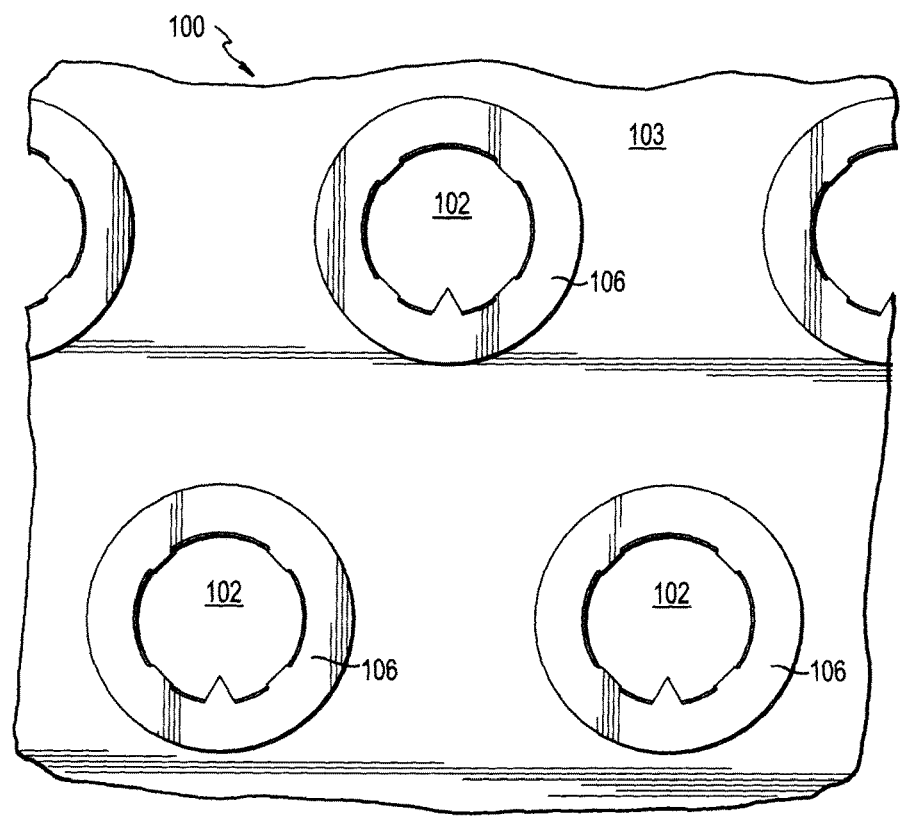
FIG. 1 is a perspective view of a tray deck fitted with a tray deck orifice device used for repair in accordance with one embodiment.
Figure 2:
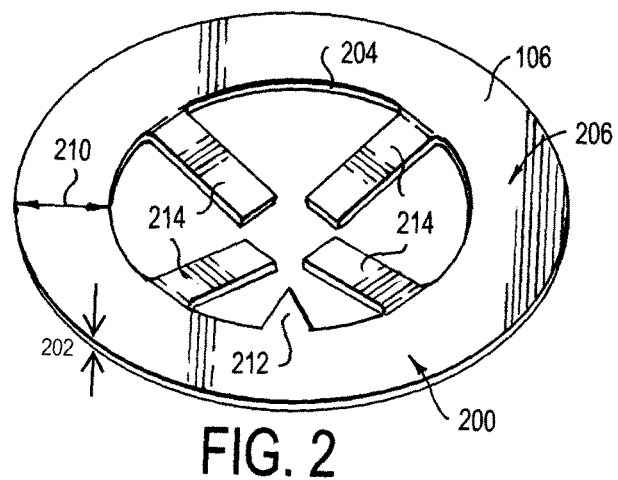
FIG. 2 is a perspective view of the tray deck orifice device used for repair illustrated in FIG. 1 in accordance with an embodiment.

Referring to FIG. 1, a repaired tray deck 100 is illustrated. The shape and design of the tray deck 100 is not particularly limited, and the repair device and repair methods disclosed herein may be used on any tray deck size, shape, and configuration known in the art. As illustrated in FIG. 1, the tray deck is a substantially flat tray, which includes a plurality of orifices 102 that extend through the entire thickness of the tray deck 100, from its upper surface 103 to its lower surface 104. As illustrated in FIG. 1, the plurality of orifices 102 have a generally circular shape, but the repair device and repair methods disclosed herein may be used to repair tray deck orifices having any size, shape, or configuration known in the art. The tray deck 100 illustrated in FIG. 1 has been in use for an extended period of time, and each of the plurality of orifices 102 have been worn down such that their diameter has enlarged. A tray deck repair device 106 is placed directly above each orifice 102 on the upper surface 103 of the tray deck 100 such that it engages the orifice 102. In one embodiment, the repair device 106 may be welded to the upper surface 103 of the tray deck 100 and aligned with each orifice 102. In another embodiment (as shown in FIG. 2), the repair device 106 may include prong(s) 214 extending from an inner surface thereof that engage each orifice 102 for attachment. Other means to attach the repair device 106 to the upper surface 103 of the tray deck 100 may include, but are not limited to, welding, adhesives, magnets, friction, or any other similar attachment mechanisms depending on the tolerances of the particular application.

Once the repair device 106 is sufficiently adhered to the upper surface 103 of the tray deck 100, the tray deck valve 108 (hereinafter, the "valve 108") may be re-positioned within the orifice 102, as illustrated in exploded view in FIG. 3. Any valve 108 known in the art and suitable for use with a particular application may be used. Suitable valves that may be used together with the repair methods set forth herein are disclosed in, for example, U.S. Pat. No. 3,080,155 and incorporated herein by reference. With the repair device 106 in place, the valve 108 no longer directly engages the enlarged, worn-down orifice 102, but now snugly engages the outer rim of the repair device 106. In this way, the liquid (not shown) maintained on the upper surface 103 of the tray deck 100 will not be able to freely flow down to the lower surface 104 of the tray deck 100 in an uncontrolled manner. It should be noted that the valve 108 need not form a liquid-tight seal with the outer rim of the repair device 106, as some minimal amount of weeping of the liquid is tolerable, but a close fit should be maintained.

Figure 3:
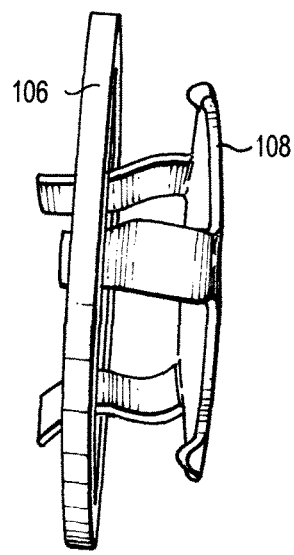
FIG. 3 is a side view of tray deck orifice device used for repair illustrated in FIG. 2 mated with a valve in accordance with an embodiment.

Referring now to FIGS. 2-3, the repair device 106 is illustrated. The repair device 106 is generally formed of a substantially flat member 200 having a defined thickness 202. In a preferred embodiment, the repair device 106 is as flat as possible and has two smooth opposing surfaces. The thickness 202 of the flat member 200 may vary and should be determined by the configuration of the tray deck 100, the valve 108, or any other parameters important to a particular process application. In one example, the flat member 102 has a thickness 202 of about 0.01-0.5 inches, or about 0.25-13 millimeters. In one embodiment, the thickness 202 is about 0.1-0.125 inches, or about 2.5-3.2 mm. In another embodiment where flexibility of the repair device 106 is useful for a particle application, the thickness 202 may be about 0.025-0.0375 inches, or about 0.63-0.95 millimeters. In one embodiment, the repair device 106 has a thickness 202 that is less than the thickness of the tray deck 100.

In a preferred embodiment, the repair device 106 has a substantially circular shape with a circular inner void 204 that forms an outer rim 206. The inner void 204 may have any diameter that is suitable for use with a particular tray deck application. Specifically, the diameter 208 of the inner void 204 should be slightly larger than the diameter of the tray deck valve 108 such that the tray deck valve 108 fits snugly within the inner void 204 of the repair device 106, as discussed above. For example, the diameter 208 of the inner void 204 may be about 0.5-2 inches, or about 1.25-5 centimeters. The diameter 208 of the inner void 204 is determined based upon the diameter of the orifices 102 on the tray deck 100, and as such, may vary depending on the particular vessel or process application.

The outer rim 206 should have a width 210 sufficient to provide support for the valve 108 that will be positioned thereon. In one embodiment, the outer rim 206 has a width 210 of about 0.1-0.5 inches, or about 0.25-1.3 centimeters. Moreover, the width 210 of the outer rim 206 should be sufficient to allow the repair device 106 to be attached to the upper surface 103 of the tray deck 100, such as by welding or any other means of attachment to the tray deck.

In one embodiment, the repair device 106 includes at least one anti-spin tab 212 extending from an inner surface of the outer rim 206 inwardly. As illustrated in FIG. 2, the anti-spin tab 212 may have a substantially triangular shape, but any shape known in the art to be suitable for use in preventing spin may be used, such as semi-circular, square, rectangular, and the like. In operation, once the repair device 106 is attached to the upper surface 103 of the tray deck 100, the anti-spin tab 212 will project inwards. Once the valve 108 is positioned within the inner void 204 of the repair device 106 as illustrated in FIG. 3, and the reactor is activated, the anti-spin tab 212 will prevent rotation of the valve 108 as the pressure builds beneath the tray deck 100. In this way, the repair device 106 does not experience the same wearing down over time that the orifices 102 of the tray deck 100 had experienced, thus extending the life of the tray deck 100.

The repair device 106 may include at least one prong 214 extending from a surface thereof. As set forth herein, one way to attach the repair device 106 to the upper surface 103 of the tray deck 100 is by mechanical means. The at least one prong 214 preferably extends from the inner surface of the outer rim 206 of the repair device 106 and has some amount of resiliency. In this way, the prong 214 engages the rim of the orifice 102 of the tray deck 100 and bends into place, thereby securing the repair device 106 to the upper surface 103 of the tray deck 100. In a preferred embodiment, the repair device 106 includes a plurality of prongs 214, such as two, three, or four, around the circumference of the inner surface of the outer rim 206. In operation, the repair device 106 would be installed using pliers or some other similar tool that allows the installer to bend the prongs 214 such that they can be extended down into the orifice 102 on the tray deck 100 and then bend back to hold the repair device 106 in place by friction.

The repair device 106 is preferably formed of the same material as the tray deck 100. In one embodiment, metals, metal alloys, ceramics, polymers, composite, or combinations thereof are used to form the repair device 106. In a preferred embodiment, metals or metal alloys are used. For example, various types of stainless steels could be used to form the repair device 106, such as grade 410s, 304L, or other grades of stainless steel. In other embodiments, the repair device 106 may be formed of exotic alloys or other non-metallic materials thereof.

Figure 4:
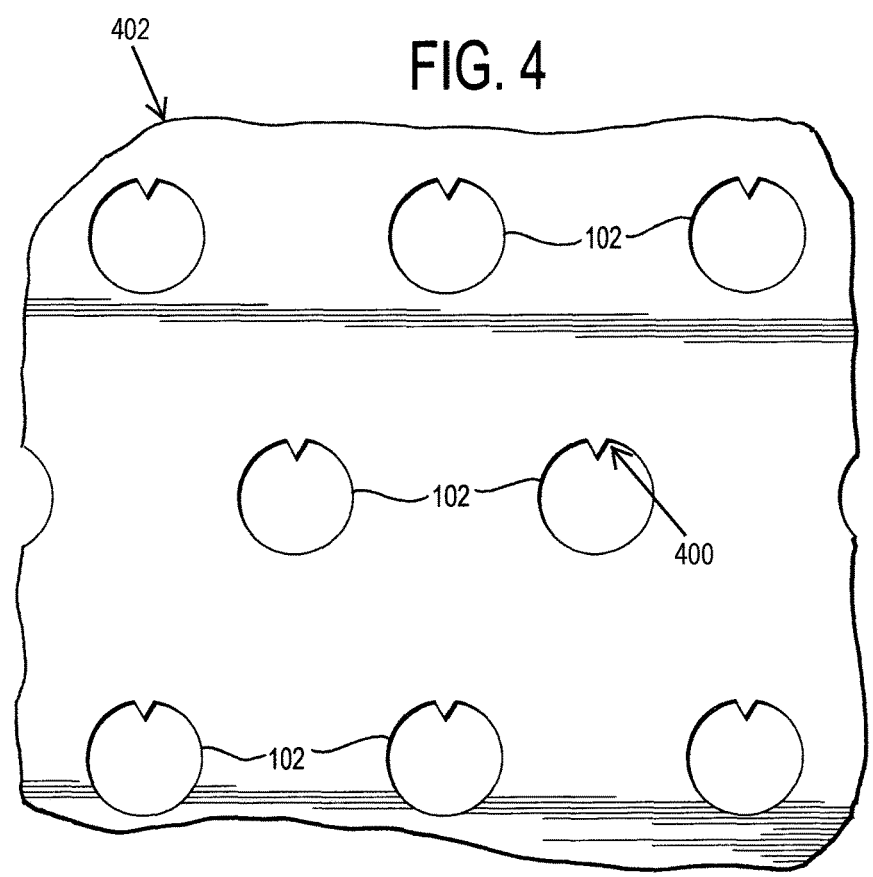
FIG. 4 is a top view of a new tray deck formed with integral tray deck orifice devices in accordance with an embodiment.

In other embodiments, the repair device may be formed or made by any means to include a flat member having a square, rectangular, triangular, hexagonal, or octagonal shape, or any other shape that is chosen for a particular tray deck application. Likewise, the inner void may also have any of the shapes referenced herein that are suitable for use in a particular tray deck application. Note that while the preferred embodiment discloses an orifice device used for repair of an existing tray deck, an orifice device 400 could be installed with or made integral within a new tray deck 402 to prevent the same wear issues, such as is illustrated in FIG. 4.

Another aspect of the invention relates to a method of repairing a damaged tray deck using the tray deck orifice device disclosed herein. As set forth above, in operation, the orifices 102 of the tray deck 100 are worn down over time and enlarge due to the rotation of the valves 108 caused by vapor pressure from beneath the tray deck 100. The methods disclosed herein allow for repair of such a damaged tray deck 100 without having to replace it. First, a separate repair device 106 is provided for each orifice 102 that is to be repaired. The repair device 106 is positioned above each orifice 102, such that the inner void 204 is aligned with the orifice 102. In one embodiment, the repair device 106 is then welded to the upper surface 103 of the tray deck 100 to permanently secure it thereto. In another alternative embodiment, the repair device 106 includes at least one or more resilient prong 214 that allows the repair device 106 to be attached to the upper surface 103 of the tray deck 100. In this embodiment, the prong(s) 214 are mechanically bent, such as with a pair of pliers, so that they extend through the orifice 102. Once the bottom surface of the repair device 106 makes contact with the upper surface 103 of the tray deck 100, the prongs are bent back to their original position, thus holding the repair device 106 in place. Once installed, the prongs 214 extend through and engage the orifice 102. In a last optional step, a valve 108 is positioned within the inner void 204 of the repair device 106 for use.

As set forth herein, the repair device 106 may also be coupled to the upper surface 103 of the tray deck 100 by welding or using adhesives, magnets, friction, or any other similar attachment mechanisms depending on the tolerances of the particular application.

Although this invention has been described in connection with specific forms and embodiments thereof, it will be appreciated that various modifications other than those discussed above may be resorted to without departing from the spirit or scope. For example, equivalent elements may be substituted for those specifically shown and described, certain features may be used independently of other features, and in certain cases, particular locations of elements may be reversed or interposed, all without departing from the spirit or scope as defined in the appended Claims.

What is claimed is:

1. A method of repairing a damaged tray deck for use in a vessel, comprising the steps of:
   providing a tray deck orifice repair device comprising a member having a defined thickness and a void;
   coupling the tray deck orifice repair device to a surface of the damaged tray deck such that the void of the tray deck repair device aligns with an orifice on the tray deck; and
   positioning a valve in the void of the tray deck orifice repair device.

2. The method of claim 1, wherein the tray deck orifice repair device has at least one inwardly extending anti-spin tab configured to prevent rotation of the valve.

3. The method of claim 1, wherein the tray deck orifice repair device is coupled to the surface of the tray deck by welding, friction, or any other means.

4. The method of claim 1, further comprising the step of bending at least one inwardly extending prong of the tray deck orifice repair device through the orifice of the damaged tray deck.

5. A method of repairing a damaged tray deck for use in a vessel, comprising the steps of:
   providing a tray deck orifice repair device comprising a substantially flat member having a defined thickness and a void at the center thereof;
   coupling the tray deck orifice repair device to a substantially flat upper surface of the damaged tray deck such that the void of the tray deck repair device aligns with an orifice on the tray deck; and
   positioning a valve in the void of the tray deck orifice repair device and the orifice of the tray deck.

6. The method of claim 5, wherein the tray deck orifice repair device has at least one inwardly extending anti-spin tab configured to prevent rotation of the valve.

7. The method of claim 5, wherein the tray deck orifice repair device has at least one inwardly extending prong configured to extend through the orifice of the damaged tray deck.

8. A tray deck for use in a vessel, comprising:
   a substantially flat tray having a plurality of orifices extending through a thickness thereof; and
   a substantially circular tray deck repair device coupled to a surface of the tray, the tray deck repair device having a substantially circular void at a center thereof, the void being aligned with one of the plurality of orifices,
   wherein the void of the tray deck repair device is configured to receive a valve.

9. The tray deck of claim 8, further comprising at least one valve positioned within the void of the tray deck orifice device.

10. The tray deck of claim 8, wherein the tray deck repair device has at least one anti-spin tab extending from an inner edge of the void.

11. The tray deck of claim 8, wherein the tray deck repair device has at least one inwardly extending bendable prong.

* * * * *